UNITED STATES PATENT OFFICE.

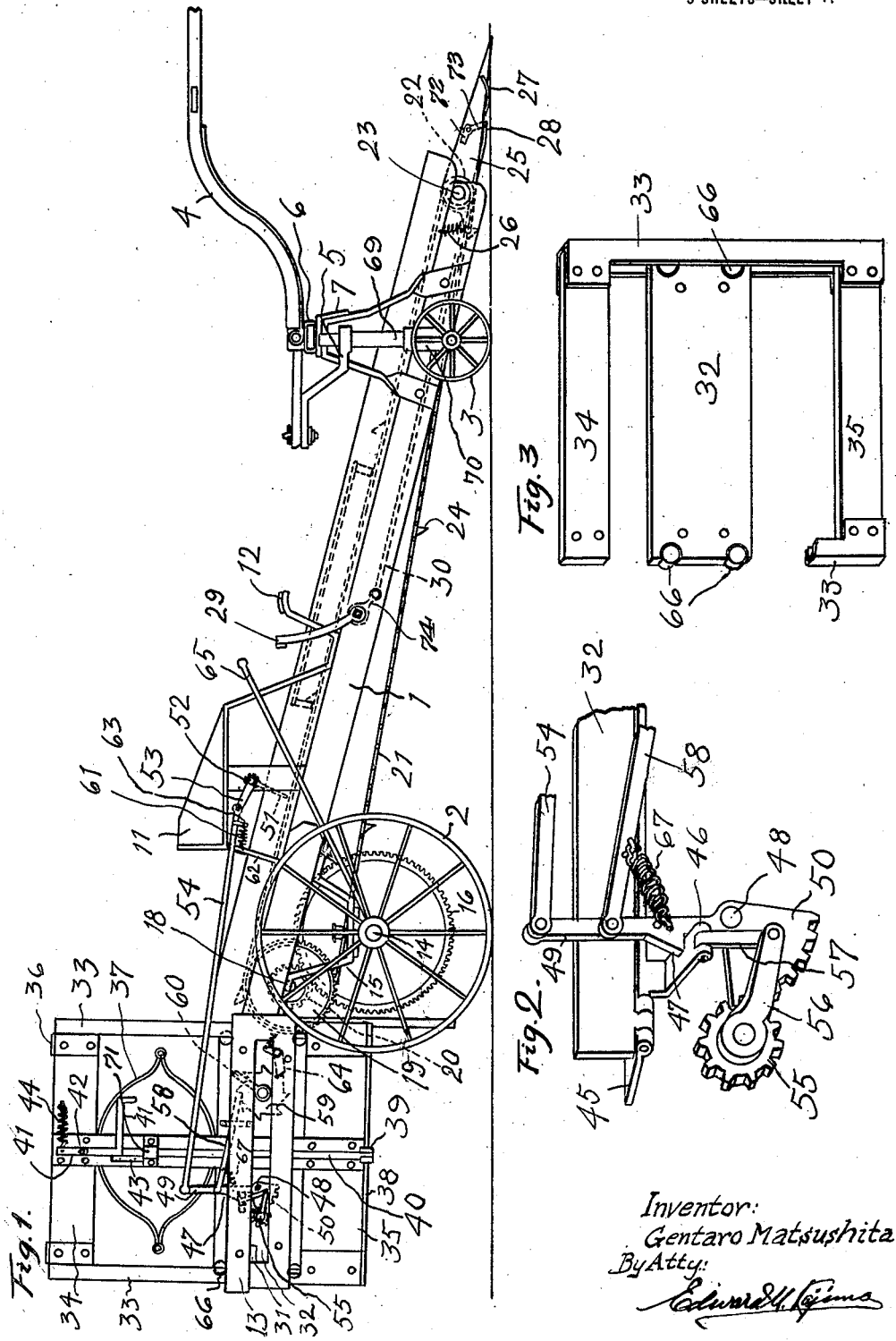
G. MATSUSHITA.
TRAY STACKING MACHINE.
APPLICATION FILED JAN. 8, 1921.
1,427,490. Patented Aug. 29, 1922.
3 SHEETS—SHEET 1.
Inventor:
Gentaro Matsushita.
By Atty:

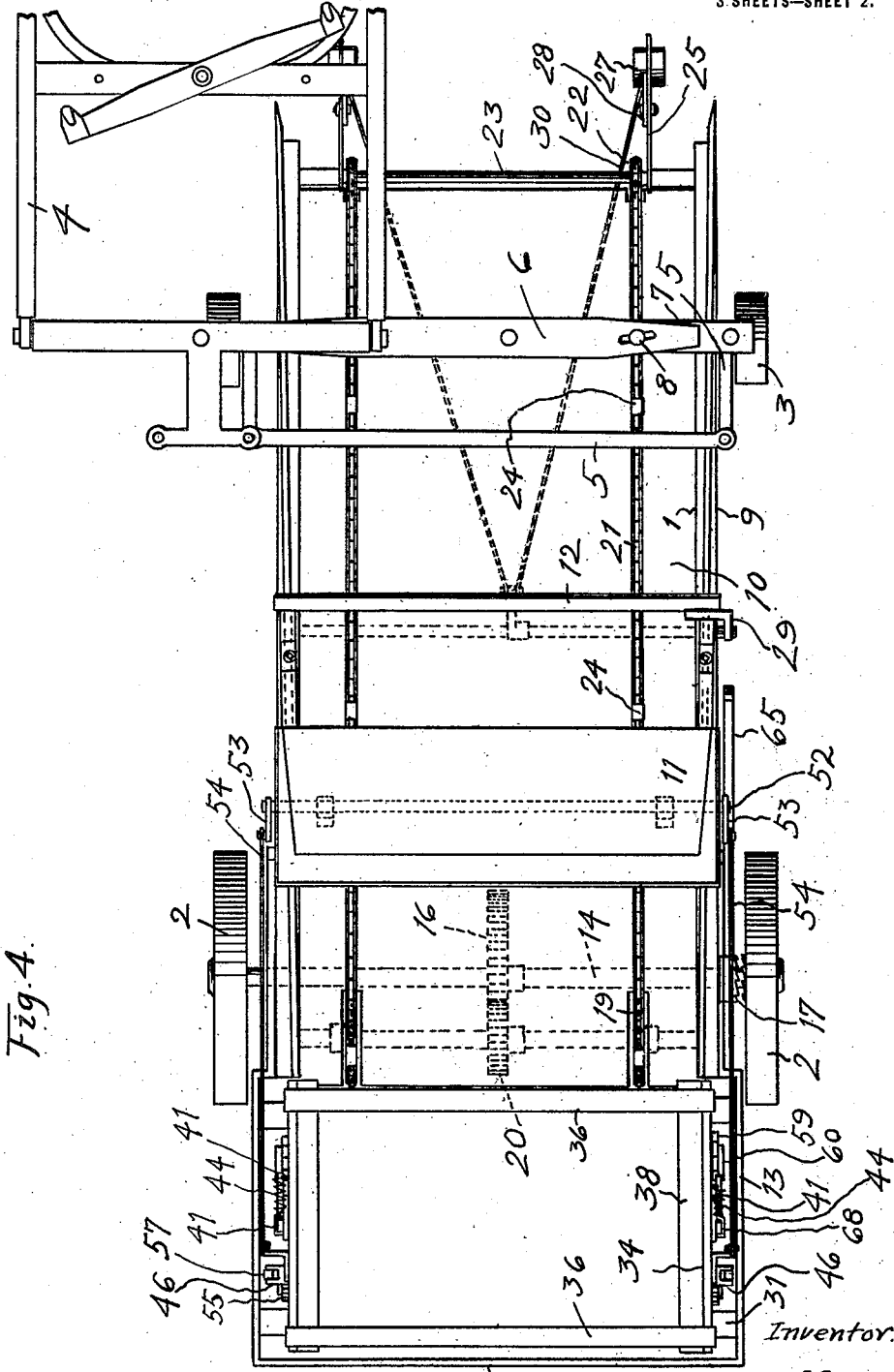

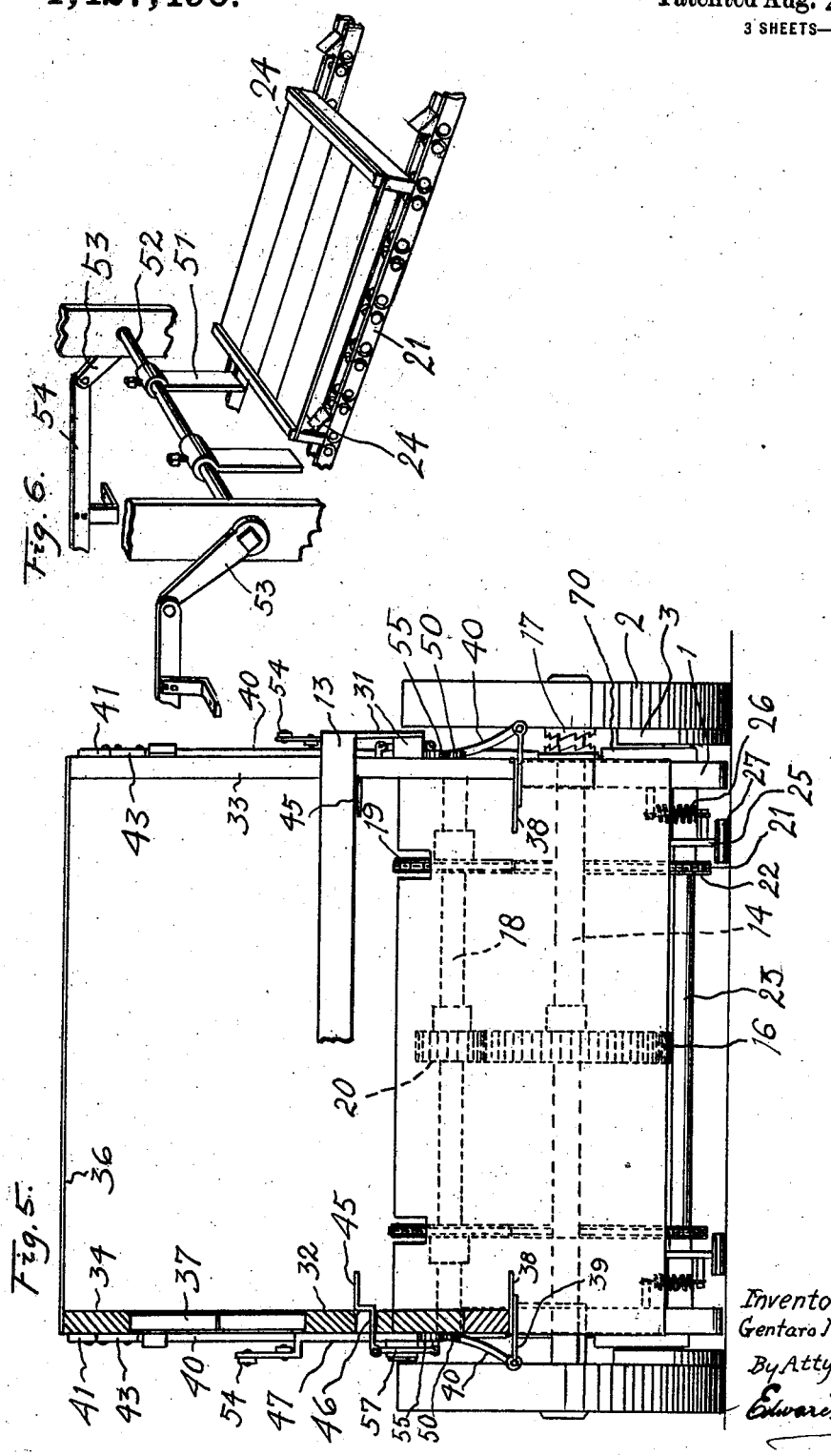

GENTARO MATSUSHITA, OF FRESNO, CALIFORNIA.

TRAY-STACKING MACHINE.

1,427,490. Specification of Letters Patent. Patented Aug. 29, 1922.

Application filed January 8, 1921. Serial No. 435,933.

*To all whom it may concern:*

Be it known that I, GENTARO MATSUSHITA, a subject of the Emperor of Japan, residing in the city and county of Fresno and State of California, have invented a new and useful Improvement in Tray-Stacking Machines, of which the following is a specification.

This invention has relation to improvements in tray-stacking machines, and comprehends means for picking up the trays from the ground, and means for depositing the gathered trays in piles upon the ground.

To accomplish these objects I have provided a main truck frame, a supplemental gathering frame, guiding elements for shifting the trays upon the gathering frame, a conveyor arranged to deliver the trays to the stacking elements, devices for stacking the trays one upon another, and releasing means whereby the stacked trays are deposited in piles upon the ground.

The invention further includes automatically operative elements whereby the advancing movement of the trays upon the conveyor serves to trip the releasing means and to operate the stacking means.

Generally speaking, the invention may be defined as consisting of the combinations of elements embodied in the claims hereto annexed, and illustrated in the drawings forming a part hereof; the invention being an improvement on the device shown and described in my application for a patent for tray-stacking machines, filed September 16, 1919, bearing Serial Number 324235.

The primary object of this invention is to place the trays when containing the grapes, in piles, for protection from rain.

In the method heretofore employed in handling and harvesting grapes, the same are placed on trays which are left in a row to dry in the field, and afterward the trays are manually gathered separately.

It is an object of this invention to facilitate the harvesting of grapes, and to attain this end, I have provided a device adapted to gather the trays from a row, to pile the trays upon one another until the pile is of a convenient size, and to then deposit the pile upon the ground.

In the drawings, Figure 1 is a side elevation of my improved tray-stacking machine. Fig. 2 is a perspective and fragmentary detail view of the releasing means. Fig. 3 is a detail view of the stacking frame. Fig. 4 is a top plan view of the machine. Fig. 5 is a rear elevation of the machine with some of the parts omitted. Fig. 6 is a perspective detail view of the tray-piling elements.

Referring to the drawings, the machine comprises a main truck frame 1, which is supported by the rear traction wheels 2, and by the forward truck wheels 3. This machine is adapted to be propelled by a horse hitched to shafts 4, which are attached to thill-frame 5, and to bar 6, swivelly connected to the main thill-frame 7. Bar 6 may be adjusted to project from either side of the main-frame 1, being secured in position by the pin 8, passing through bar 6 and main thill-frame 7. The side bars 9, of frame 1, are connected by a platform 10, and further reinforced by the driver's seat 11, and footrest 12, and at the rear by a frame-element 13, which serves to support the stacking elements. Traction wheels 2 are mounted on a shaft 14, journalled in bearing standards 15, fixed to the main frame 1.

Wheels 2 are independently rotative upon the main shaft 14, which is provided with a master-gear wheel 16. Shaft 14, through the clutch 17, may be placed in operative engagement with the traction wheels, so that the advancing movement of the machine will serve to rotate the master gear wheel 16. Sprocket shaft 18 is provided with sprockets 19 and a pinion 20 which is in mesh with gear wheel 16. Link chains 21 run over the sprockets 19, and at the forward end of the main frame, over the idler sprockets 22, independently rotative upon shaft 23. Conveyor bars 24 are arranged at intervals upon chains 21. Tray forks 25, pivotally connected to shaft 23, are held in engagement with the ground by springs 26, and are adapted to gather the trays upon the advance motion of the machine. Stops 27, fixed to tray-forks 25, serve to limit the depth to which the forks may penetrate the ground. The advancing movement of the machine serves to force the trays rearwardly and in engagement with the conveyor bars 24, which then carry the trays along the inclined platform 10, to the stacking elements. To place the trays in alignment before they are engaged by the conveying elements, I have provided on opposite sides of the platform, the tray adjusters 28, pivotally connected relative to tray-gathering forks 25, and having relatively short arms 72, normally out of the path of the trays as they engage with the gathering forks, and having relatively long arms 73. Foot lever 29, pivotally mounted relative to the main frame, has a depending lever arm 74. Links 30 connect lever arms 73, of tray adjusters 28, and lever arm 74. The operator, by actuating the foot lever with a forward movement, may momentarily force the tray-adjusting arms 72, of the tray adjusters, in the path of an advancing tray, which is thereupon forced in alignment with the frame and conveyor bars 24. When the operator releases foot lever 29, the adjusters 28 will drop out of the path of the advancing tray, or to inoperative position, as the tray is carried along by the advancing movement of the machine.

At the rear end of the conveyor, I have provided means for stacking the trays, consisting of depending and inwardly projecting brackets 31, fixed to frame member 13, and to the guide frame members 32. On these guide-frame members 32, are mounted the movable stacking frame members 33, which, with top bars 34 and bottom bars 35, and transverse bars 36, constitute a vertically sliding frame for the stack of trays. Springs 37, interposed between the fixed guide frame members 32, and the top bars 34, of the sliding frame, tend to maintain the sliding frame in its uppermost position. Tiltable and inwardly projecting tray-holding member 38, are hingedly connected to the bottom of the sliding frame, and have fixed thereto the lever arms 39, which are pivotally connected to the vertically arranged sliding bars 40, working in guides 71 on the sliding frame. When there are no trays on holding members 38, the weight of bars 40, serves to maintain the holding members in a tray-receiving position, and a detent member 41, pivotally connected at the point 42 with the sliding frame, engages with bars 40, thereby holding the tray-receiving members 38 in operative position while a number of trays are stacked thereon as hereinafter set forth. A stop 43, limits the movement of detent member 41, and a spring 44 serves to retract the detent member to operative position relative to the corresponding sliding bar 40.

As the trays leave the conveyor, they are forced upon tiltable tray-carriers 45, hingedly connected to guide frame members 32, which have projecting arms 46, normally in engagement with detent members 47. These detent members 47, are pivotally connected at the points 48, with guide-frame members 32, and are provided with arms 49, and on the opposite end, with segment gears 50. Trip arms 51, mounted on shaft 52, are normally disposed in the path of the trays as they are carried by the conveyor to the rear of the machine. Levers 53, fixed to shaft 52, are connected by link-bars 54, with detent arms 49, the arrangement being such that an advancing tray on the conveyor, will serve to automatically release the tray which is upon the tiltable carrier, through the pinions 55, in mesh with gear sectors 50, the levers 56 integral with pinions 55, and links 57, connecting the levers 56 with arms 46.

The sliding frame moves downward step by step as the trays are deposited on the holders and overcome the resistance of the supporting springs, these springs being constructed of such resistance, that the sliding frame will only assume its lowermost position when eight full trays are deposited on the holders.

On each movement of the detent members 47, to release the tray upon the carriers 45, the pawl 58 actuates the ratchet wheels 59. When eight trays have been released from the carriers and are stacked on the tiltable tray holders 38, the cams 60, fixed to ratchet wheels 59, are brought to a vertical position for engagement with detent members 41, and actuating them to release the bars 40, which hold the tray-holding members 38 in operative position. Springs 61, connected to seat-standards 62, and to lugs 63, on link-bars 54, retract the trip arms 51 and detent members 47 to operative position. Pawls 64, limit the turning movement of the ratchet wheels to one direction. The arrangement is such that the pawls 64 will actuate the ratchet wheels for one-eighth of a revolution just prior to the release, by detent members 47, of arms 46 fixed to the tray carriers. This allows the release of the stack of trays, and return of the sliding frame to its uppermost position, just prior to the release of the tray carriers from their operative position.

From the foregoing description, it may be seen that I have provided efficient means for gathering the trays from a row, for arranging them in stacks of eight, and for depositing them in piles upon the ground, all of which functions are accomplished with the advancing movement of the machine.

The lever 65 is provided for operating the clutch from the driver's seat position. Antifriction rollers 66, are provided for the sliding and stacking frame. A spring 67, holds the ratchet pawl 58, in operative position. The truck frame members 69 and 70 serve to support the main frame member 7.

What is claimed is:

1. In a tray-piling machine, the combination with an inclined platform, of traction wheels supporting the platform at the rear thereof, truck wheels supporting the forward end of the platform, a conveyor moving on the platform and actuated by the movement of the traction wheels, a fixed shaft disposed at the forward end of the platform, tray-gathering forks pivotally mounted on the fixed shaft, spring means for maintaining the forks in contact with the ground, means for limiting the depth to which the forks penetrate the ground, means for aligning the trays with the conveyor prior to their delivery from the forks to the conveyor, means for stacking the trays as they are delivered from the conveyor, and means for dropping the stacked trays when a full stack is attained.

2. In a tray-piling machine, the combination with an inclined platform, of traction wheels supporting the platform at the rear thereof, truck wheels supporting the forward end of the platform, a conveyor moving on the platform and actuated by the movement of the traction wheels, the conveyor traveling in a direction opposite to the advance motion of the machine, a stacking frame disposed at the rear of the inclined platform, tray-stack holders hinged to the stacking frame, tray carriers hinged to the rear portion of the main frame, said tray-carriers being superposed relative to the tray-stack holders, means actuated by the trays on the conveyor, for releasing the tray-carriers whereby the trays are deposited on the tray-stack holders, and means for releasing the tray-stack holders when a predetermined number of trays are deposited thereon.

3. In a tray-piling machine the combination with an inclined platform having tray-gathering forks, an endless conveyor carrying the trays from the forks to the rear of the platform, and integral guide-frame elements at the rear of the conveyor, of a sliding frame mounted on the guide-frame elements, springs supporting the sliding frame in its uppermost position, tray-holders at the bottom of the sliding frame, said frame sliding downward step by step as the trays are deposited on the holders and overcome the resistance of the supporting springs, tray-carriers tiltably mounted relative to the guide-frame members, detent means for the tray-carriers, means actuated by the trays on the conveyor to release the detent members holding the tray-carriers, means for releasing the tray-holders, and a ratchet and pawl mechanism operated by the tray-carrier releasing mechanism, and serving to actuate the tray-holder releasing means.

In testimony whereof, I hereunto affix my signature this 31st day of December, 1920.

GENTARO MATSUSHITA.